Jan. 27. 1925.  J. ELLINGHAUSEN  1,524,425
HOG HOLDER
Original Filed July 10, 1923
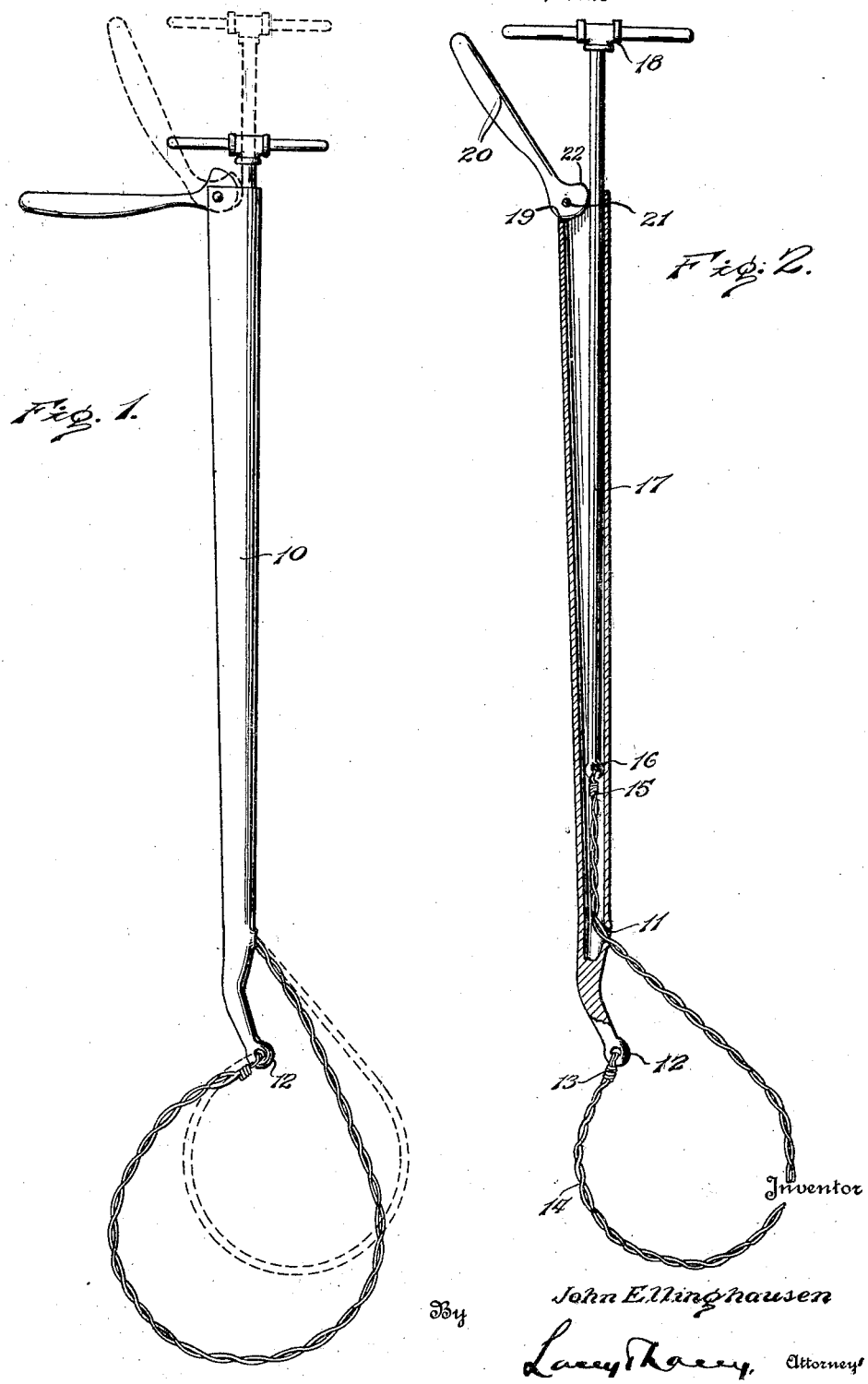

Patented Jan. 27, 1925.

1,524,425

UNITED STATES PATENT OFFICE.

JOHN ELLINGHAUSEN, OF HOOPER, NEBRASKA.

HOG HOLDER.

Application filed July 10, 1923, Serial No. 650,687. Renewed September 23, 1924.

*To all whom it may concern:*

Be it known that I, JOHN ELLINGHAUSEN, a citizen of the United States, residing at Hooper, in the county of Dodge and State of Nebraska, have invented certain new and useful Improvements in Hog Holders, of which the following is a specification.

My invention relates to an implement for holding a hog's mouth tightly closed to prevent him from squealing and to have such command over the hog that he cannot run away.

The object of the invention is, accordingly, to provide the implement with a loop which engages around the upper and lower jaws of the animal and can be drawn up tightly and held in that position as long as the animal needs to be held thus captive.

Another object of the invention is to furnish an implement of this character of very simple but strong construction, and which can be quickly applied and quickly released.

In the accompanying drawing, one embodiment of the invention is illustrated; and—

Figure 1 presents a side elevation of the implement; and

Figure 2 is a longitudinal section thereof.

The implement consists of a hollow shaft or tubular member 10, which preferably tapers from its handle end to the loop end. The implement is open at the handle end but closed at the loop end with the exception of a small opening 11 a short distance back from the front end thereof, this opening leading into the hollow portion of the shaft 10.

The small or forward end of the hollow shaft 10 forms a finger which is solid and slightly bent to one side and terminates with an eyelet 12. In this eyelet is secured as at 13, one end of a loop member 14, which may be made from twisted wire or a chain. This loop member enters the opening 11 and continues down the hollow portion of the shaft 10. Its opposite end is secured as at 15 in a eyelet 16 formed at the inner end of the operating rod 17 adapted to be axially displaced in the hollow shaft 10. The operating rod 17 is of sufficient length to project with its other end beyond the heavy end of the hollow shaft 10, and it is provided with a T-handle 18.

At the heavy end of the hollow shaft 10 is furnished a slit as at 19 adapted to accommodate a clamping handle 20 which is fulcrumed as at 21 on a pin or rivet running across the hollow shaft 10. The inner end of the clamping lever 20 is flattened out to provide a cam 22, by means of which the operating rod 17 may be held rigidly against the opposite side of the hollow shaft 10 in any axial position desirable.

The operation of the implement is as follows. After the animal has been caught, the loop 14 is laid around its snout and while holding the hollow shaft 10 stationary, the operating rod 17 is drawn back as far as possible by means of the handle 18. The slack portion of the loop member 14 will then be drawn in by the operating rod into the hollow part of the shaft 10, and as soon as a tight grip is attained around the jaws of the animal, the clamping lever 20 is swung inwards until a good hold is obtained on the operating rod 17. As long as the clamping lever is held down in this manner, the animal will be held fast by the implement.

It is evident that minor changes may be made in the construction of the implement without deviating from the scope of the invention, such as, for instance, making the shaft 10 of wood and guiding the operating rod in staples or the like on the same.

Having thus described the invention, what is claimed as new is:

An implement of the class described comprising a substantially straight shaft having a tapered bore closed at the small end thereof, a solid finger integral with the shaft at the small end of the bore, said finger being slightly bent out from the axis of the shaft and terminating with an eyelet, a slit being provided on the same side of the shaft as said eyelet and leading into the small end of the bore, an operating rod guided in said bore having an eyelet at its inner end and a handle at its outer end, a loop member having its ends secured respectively in said eyelets, said loop member running through said slit, a lever pivoted in said shaft at the large end of the bore and adapted to swing in an axial plane of the shaft, and a cam on said lever extending into said bore adapted to press said operating rod against the wall of the bore.

In testimony whereof I affix my signature.

JOHN ELLINGHAUSEN. [L. S.]